United States Patent [19]

Shimizu

[11] Patent Number: 5,267,625
[45] Date of Patent: Dec. 7, 1993

[54] STEERING APPARATUS WITH VARIABLE STEERING ANGLE RATIO FOR PITMAN ARM STEERING MECHANISM

[75] Inventor: Yasuo Shimizu, Kawachi, Japan

[73] Assignee: Honda Giken Kogyo Kabushiki Kaisha, Tokyo, Japan

[21] Appl. No.: 968,068

[22] Filed: Oct. 30, 1992

[30] Foreign Application Priority Data

Oct. 30, 1991 [JP] Japan .............................. 3-097292[U]
Oct. 31, 1991 [JP] Japan .................................. 3-313745

[51] Int. Cl.⁵ .......................... B62D 5/04; B62D 6/00
[52] U.S. Cl. .................... 180/79.1; 280/95.1; 280/96
[58] Field of Search ........................ 180/79, 79.1, 79.3; 280/846, 95.1, 96

[56] References Cited

U.S. PATENT DOCUMENTS 2,820,872  1/1958  Carr .
3,772,962 11/1973  Suzuki ................................... 91/359
5,174,407 12/1992  Shimizu et al. .................... 180/79.1

FOREIGN PATENT DOCUMENTS

0317390  5/1989  European Pat. Off. .
61-122075 6/1986  Japan .
772682   4/1957  United Kingdom .
1410956 11/1972  United Kingdom .
2248216A 4/1992  United Kingdom .
2252282  8/1992  United Kingdom ............... 180/79.1

Primary Examiner—Mitchell J. Hill
Attorney, Agent, or Firm—Armstrong, Westerman, Hattori, McLeland & Naughton

[57] ABSTRACT

A steering apparatus has a sector shaft rotatable in response to rotation of a steering wheel for steering road wheels through a pitman arm coupled to the sector shaft. A torque sensor for detecting a steering torque applied to the steering wheel is positioned closer to the steering wheel than the sector shaft in a path of the steering torque from the steering wheel to the sector shaft. An electric motor is operatively coupled to the sector shaft for applying an assistive force to the sector shaft. The electric motor is controlled by a controller based on an output signal from the torque sensor. A steering angle ratio varying mechanism is disposed between the sector shaft and the torque sensor for varying the ratio of an angle through which the road wheels are turned to an angle through which the steering wheel is turned.

12 Claims, 11 Drawing Sheets

STEERING APPARATUS WITH VARIABLE STEERING ANGLE RATIO FOR PITMAN ARM STEERING MECHANISM

BACKGROUND OF THE INVENTION

1. Field of the Invention

The present invention relates to a steering apparatus for use with a pitman arm steering mechanism, the steering apparatus having a variable steering angle ratio, i.e., the variable ratio of an angle through which steerable road wheels are turned to an angle through which a steering wheel is turned.

2. Description of the Prior Art

Pitman arm steering mechanisms comprise a sector shaft rotatable with a steering wheel and a pitman arm angularly movable by the sector shaft, the pitman arm being operatively coupled to steerable road wheels of a motor vehicle. When the steering wheel is turned, the pitman arm is angularly moved by the sector shaft to turn the road wheels for thereby steering the motor vehicle.

Some pitman arm steering mechanisms include a torque sensor for detecting a steering torque applied to the steering wheel, and a hydraulic actuator combined with a steering gear mechanism such as a ball screw mechanism between the sector shaft and the steering wheel. The pitman arm steering mechanisms with the torque sensor and the hydraulic actuator operate as an integral power steering system. The hydraulic pressure supplied to the hydraulic actuator is controlled based on the steering torque detected by the torque sensor, and the hydraulic actuator generates an assistive force to assist in the steering action.

It is known in the art that a steering angle ratio, i.e., the ratio of an angle through which the road wheels are turned to an angle through which the steering wheel is turned, affects the ease with which the motor vehicle can be maneuvered, the stability of the motor vehicle when it runs straight, and the feeling that the driver has in steering the motor vehicle. Japanese patent application No. 3-25553 (corresponding to UK patent application GB 2252282A) discloses a steering apparatus having a mechanism for varying the steering angle ratio. The disclosed mechanism for varying the steering angle ratio may possibly be incorporated in a pitman arm steering apparatus.

Another known steering apparatus with a variable steering angle ratio is disclosed in Japanese laid-open utility model application No. 54-38664. The disclosed steering apparatus includes a steering shaft rotatable by a steering wheel, a nut coupled to the input shaft through a ball screw mechanism which converts rotary motion to linear motion, a lever engaging the nut through a cam mechanism for converting linear motion of the slider to rotary motion, and a cross shaft fixed to the lever. The cross shaft is operatively coupled to road wheels through a pitman arm, for example. The point at which the cam mechanism engages the lever is displaceable to vary an effective radius of the lever for thereby varying a steering angle ratio. The cam mechanism includes a pin mounted on the nut and slidably engaging in a cam groove defined radially in the lever. The pin slides in pressing engagement with a surface of the cam groove. Since a large load is imposed on the pin, the pin tends to wear soon. When the pin is worn, it does not move smoothly in the cam groove, resulting in a reduction in control accuracy, and it also suffers reduced durability.

SUMMARY OF THE INVENTION

It is an object of the present invention to provide a steering apparatus with a variable steering angle ratio for use with a pitman arm steering mechanism.

According to the present invention, there is provided a steering apparatus for use with a pitman arm steering mechanism having a pitman arm, comprising a steering wheel, a sector shaft rotatable in response to rotation of the steering wheel for steering road wheels through the pitman arm, a torque sensor for detecting a steering torque applied to the steering wheel, the torque sensor being positioned closer to the steering wheel than the sector shaft in a path of the steering torque from the steering wheel to the sector shaft, electric actuator means operatively coupled to the sector shaft for applying an assistive force to the sector shaft, control means for controlling the actuator means based on an output signal from the torque sensor, and ratio adjusting means disposed between the sector shaft and the torque sensor for varying the ratio of an angle through which the road wheels are turned to an angle through which the steering wheel is turned.

According to the present invention, there is also provided a steering apparatus for use with a pitman arm steering mechanism having a pitman arm, comprising a steering wheel, a conversion member linearly movable in response to rotation of the steering wheel, the conversion member having a radial arm, a sector shaft rotatable in response to linear movement of the conversion member for steering road wheels through the pitman arm, and a ratio adjusting mechanism operatively coupled between the conversion member and the sector shaft for varying the ratio of an angle through which the road wheels are turned to an angle through which the steering wheel is turned, the ratio adjusting mechanism comprising a lever integral with the sector shaft for angular movement in unison therewith, and bearing means disposed between the radial arm and the lever for allowing smooth movement of the radial arm with respect to the lever.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Like or corresponding parts are denoted by like or corresponding reference characters throughout views.

Figure 1:
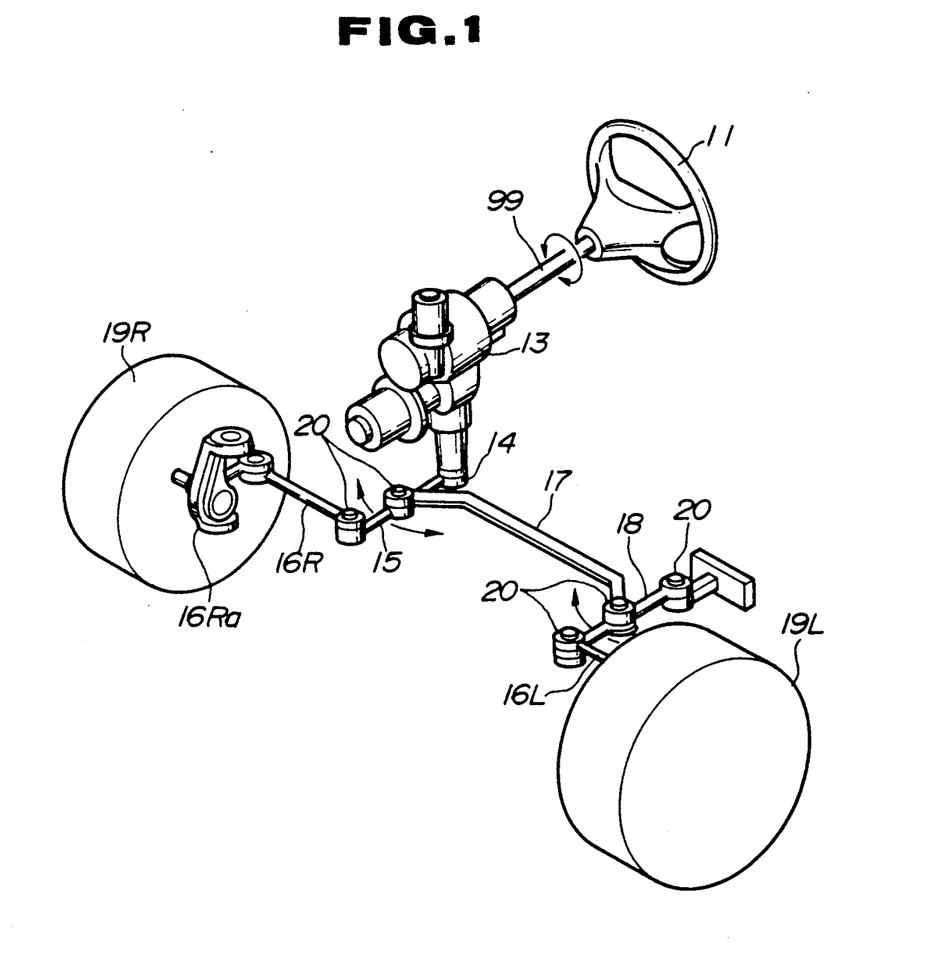
FIG. 1 is a perspective view of a steering apparatus according to an embodiment of the present invention, the steering apparatus being combined with a pitman arm steering mechanism in a motor vehicle.

FIGS. 1 through 6 show a steering apparatus embodying the principles of the present invention, the steering apparatus being combined with a pitman arm steering mechanism in a motor vehicle. The steering apparatus shown in FIGS. 1 through 6 is a power-assisted steering apparatus. As shown in FIG. 1, a steering wheel 11 is fixed to an end of a steering shaft 99 which is coupled coaxially to an outer end of an input shaft 12 (see FIG. 2) rotatably supported in a case 13 fixedly mounted on a motor vehicle body. The input shaft 12 is disposed in an upper portion of the case 13, which also supports a vertical sector shaft 14 rotatably in a lower portion thereof. The input shaft 12 is operatively connected to the sector shaft 14 through various components in the case 13 as described below.

In FIG. 1, a pitman arm 15 is joined at one end thereof substantially perpendicularly to the lower end of the sector shaft 14. The pitman arm 15 extends substantially longitudinally with respect to the motor vehicle. The pitman arm 15 is angularly movable about the axis of the sector shaft 14 in unison therewith when the sector shaft 14 rotates about its axis. The opposite end of the pitman arm 15 is coupled by a ball joint 20 to a tie rod 16R that is connected to a knuckle 16Ra on which a road wheel 19R is rotatably mounted. The pitman arm 15 is also coupled at its intermediate point to one end of a relay rod 17 by a ball joint 20. The other end of the relay rod 17 is coupled to an idler arm 18 at its intermediate point by a ball joint 20. The idler arm 18, which extends parallel to the pitman arm 15, has one end pivotally coupled to the motor vehicle body through a ball joint 20 and the opposite end to a tie rod 16L through a ball joint 20. The tie rod 16L is connected to a knuckle (not shown) on which a road wheel 19L is rotatably mounted.

Figure 2:
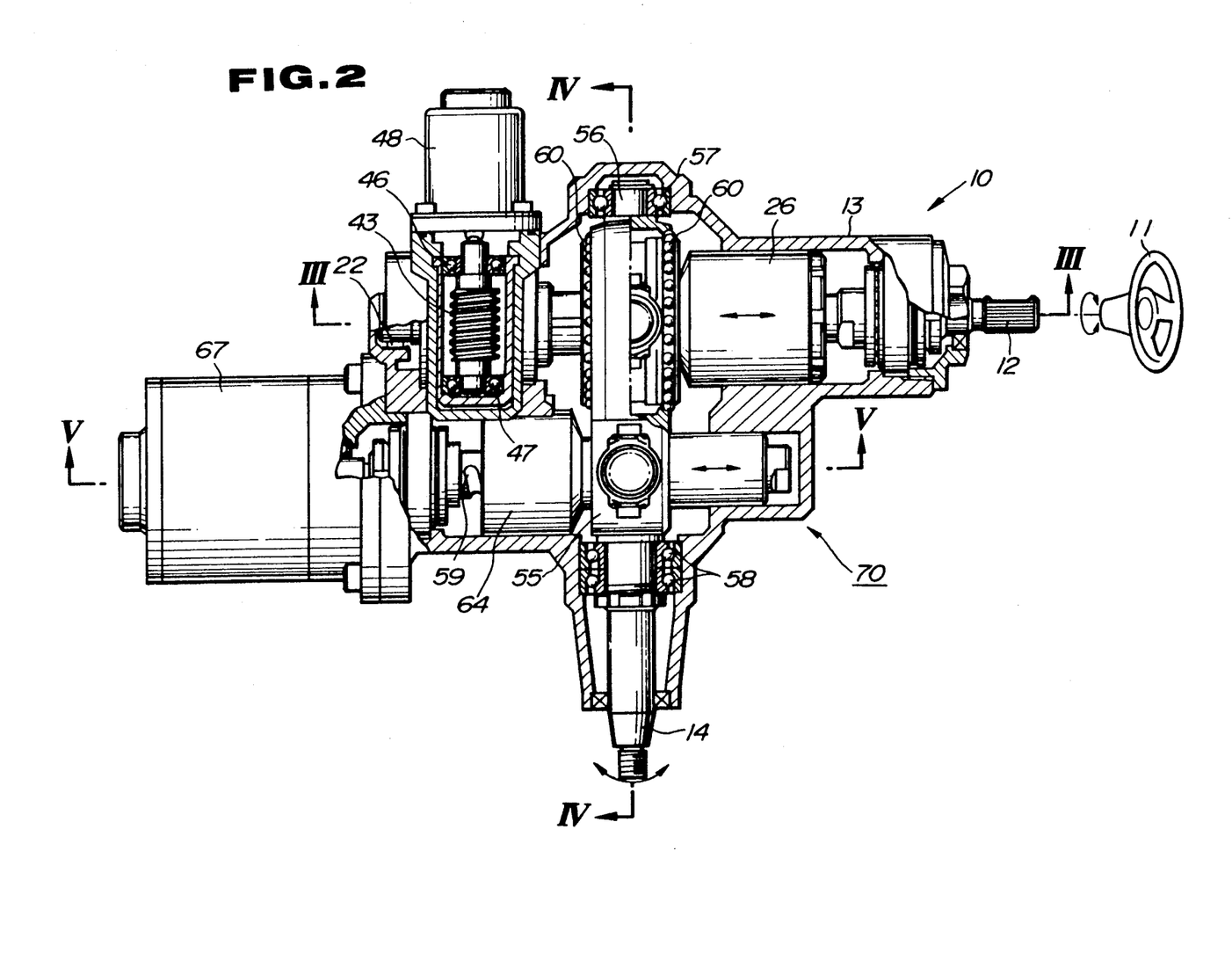
FIG. 2 is a vertical cross-sectional view of the steering apparatus shown in FIG. 1.
Figure 3:
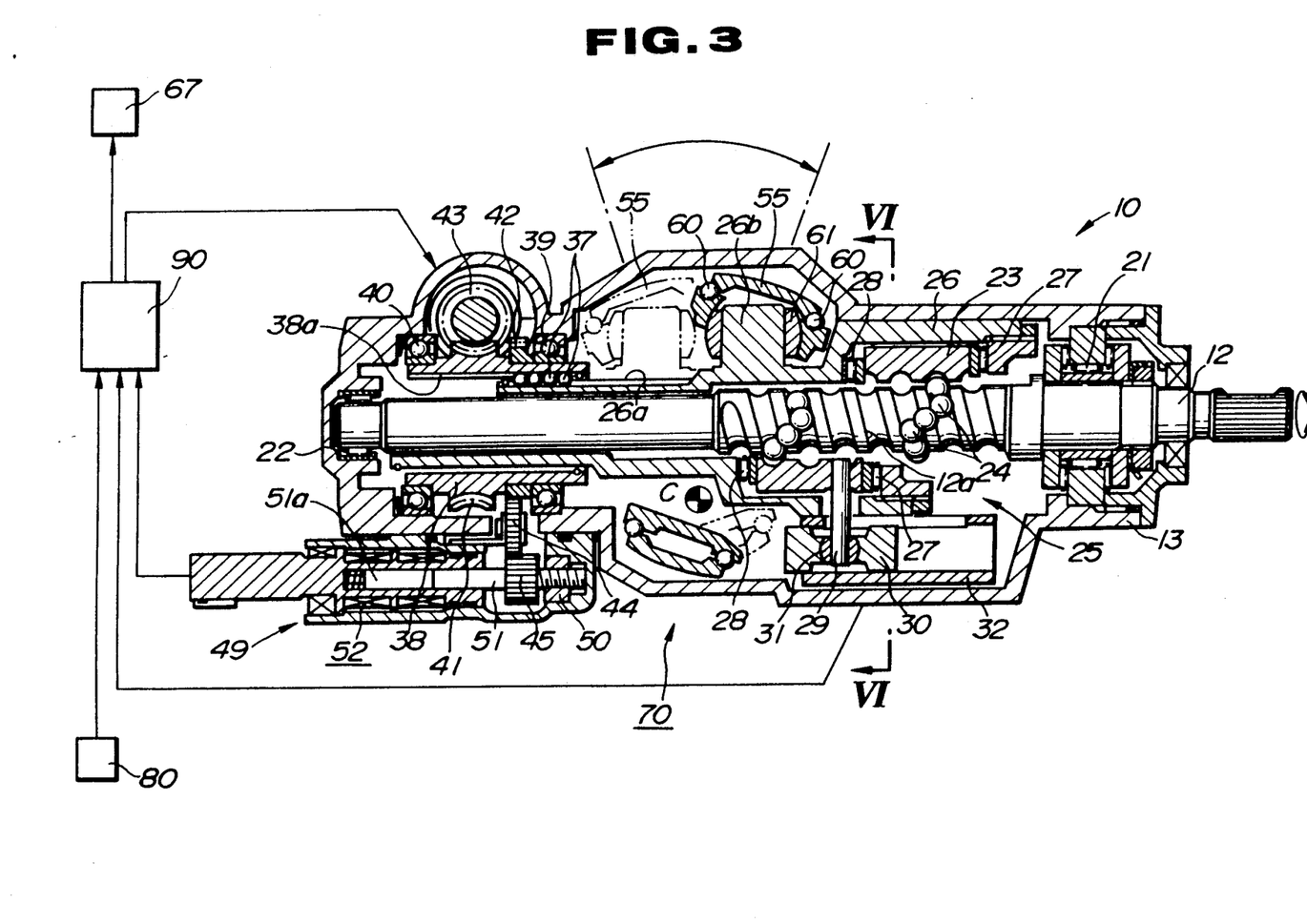
FIG. 3 is a cross-sectional view taken along line III—III of FIG. 2.

In the steering apparatus, generally denoted at 10 in FIGS. 2 and 3, the input shaft 12 is rotatably supported in the case 13 by bearings 21, 22, and has an externally threaded portion 12a (screw shaft) positioned within the case 13. The bearing 21 has an inner race fixed to the input shaft 12 and having a substantially channel-shaped cross section, and an outer race rotatably supported in the inner race by axial and radial needle rollers. The input shaft 12 is prevented from being axially displaced by the bearing 21.

A ball nut 23 is rotatably mounted on the externally threaded portion 12a with balls 24 rollingly riding in helical grooves defined in the ball nut 23 and the externally threaded portion 12a. The externally threaded portion 12a, the ball nut 23, and the ball 24 jointly serve as a first ball screw mechanism 25. When the ball nut 23 and the input shaft 12 rotate relatively to each other, the balls 24 circulate through a circulation hole defined in the ball nut 24. The ball nut 23 is rotatably held in a conversion nut 26 by bearings 27, 28. The ball screw mechanism 25 operates in the known manner, i.e., when the externally threaded portion 12a rotates about the axis of the input shaft 12, the ball nut 23 is axially displaced along the externally threaded portion 12a. Therefore, the angular displacement of the externally threaded portion 12a corresponds to the axial displacement of the ball nut 23.

Figure 6:
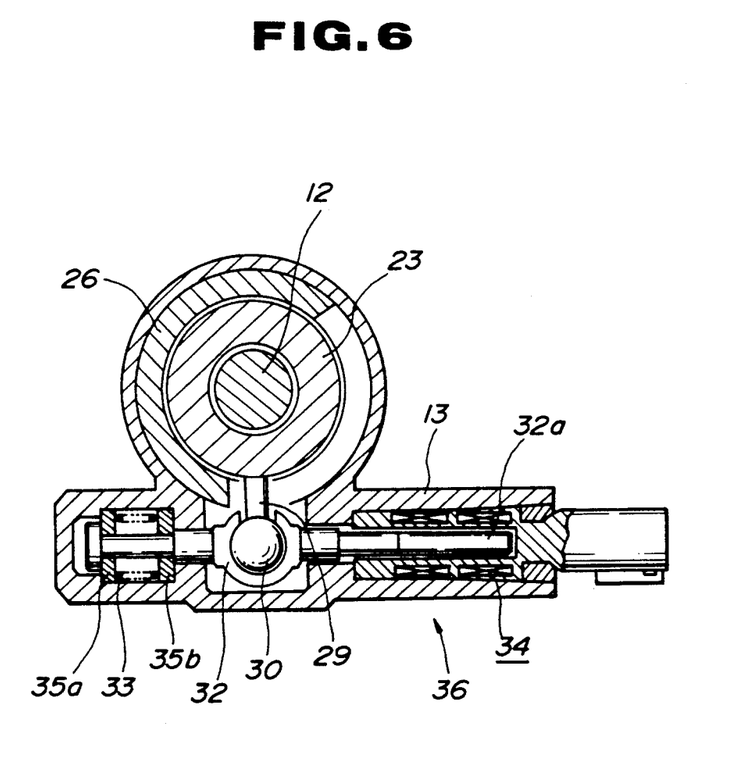
FIG. 6 is a cross-sectional view taken along line VI—VI of FIG. 3.

A radially outwardly extending pin 29 is fixed to the ball nut 23. As also shown in FIG. 6, the pin 29 extends radially through the conversion nut 26 and is coupled to a slider 30 through a spherical bushing 31. The slider 30 is slidably fitted in a detection rod 32 for sliding movement in unison with the ball nut 23 parallel to the input shaft 12. The detection rod 32 axially movably extends in a direction perpendicular to the input shaft 12. The slider 30 is positioned centrally in the detection rod 32.

In FIG. 6, a spring 33 acts on one end of the detection rod 32, and a core 32a is fixed coaxially to the other end of the detection rod 32. The position of the core 32a can be detected by a differential transformer 34. The spring 33 is disposed under compression between a retainer 35a fixed to the end of the detection rod 32 and a retainer 35b axially slidably held against a shoulder of the detection rod 32. The spring 33 urges the retainers 35a, 35b apart from each other against respective steps in the case 13 for keeping the detection rod 32 in a neutral position as shown in FIG. 6.

The differential transformer 34, which is of a known structure, has a primary coil, a secondary coil, and a compensation coil, which are connected electrically to a controller 90 (see FIG. 3). When an alternating current is supplied to the primary coil of the differential transformer 34, a current is induced across the secondary coil depending on the position of the core 32a with respect to the secondary coil, the current being representative of the position of the core 32a. The core 32a and the differential transformer 34 jointly provide a torque sensor 36 for detecting a steering torque applied to the steering wheel 11 and hence the input shaft 12.

As shown in FIG. 3, the conversion nut 26 is of a hollow structure through which the input shaft 12 is loosely inserted, and is axially and angularly movably accommodated in the case 13. The conversion nut 26 holds the ball nut 23 in one end portion, and has an axial groove 26a defined in an outer circumferential surface of the opposite end portion. The conversion nut 26 also has an integral arm 26b extending radially outwardly from an intermediate portion thereof. The arm 26b is operatively coupled to a lever 55. Balls 37 are rollingly received in the axial groove 26a and also in an axial groove 28a defined in an inner peripheral surface of a worm wheel 38. Therefore, the conversion nut 26 is operatively coupled to the worm wheel 38 through the balls 37 for axial movement with respect to and rotation in unison with the worm wheel 38.

The worm wheel 38, which is hollow, is rotatably supported in the case 13 by bearings 39, 40. The worm wheel 38 has a driven gear 41 and a sensor gear 42 on its outer circumferential surface. The driven gear 41 is held in mesh with a worm 43, and the sensor gear 42 is held in mesh with an idler gear 44 which meshes with a detection gear 45 of a steering angle ratio sensor 49.

As shown in FIG. 2, the worm 43 is rotatably supported in the case 13 by bearings 46, 47, and is connected to an electric motor 48 for adjusting the steering angle ratio. When the motor 48 is energized, the worm 43 is rotated about its own axis, rotating the worm wheel 38 and hence the conversion nut 26.

As illustrated in FIG. 3, the steering angle ratio sensor 49 comprises a core shaft 51 having a core 51a on one end thereof and threaded in a nut 50 fixed to the case 13 for axial displacement parallel to the input shaft 12. Any axial displacement of the core shaft 51 can be detected by a differential transformer 52. The detection gear 45 is fixedly mounted on the core shaft 51. When the detection gear 45 is rotated, the core shaft 51 is axially displaced. The axial position of the core shaft 51 represents the angular displacement of the worm wheel 38, i.e., the steering angle ratio. The differential transformer 52 is identical in structure and function to the differential transformer 34. The differential transformer 52 is electrically connected to the controller 90, and applies a detected signal indicative of the steering angle ratio to the controller 90.

Figure 4:
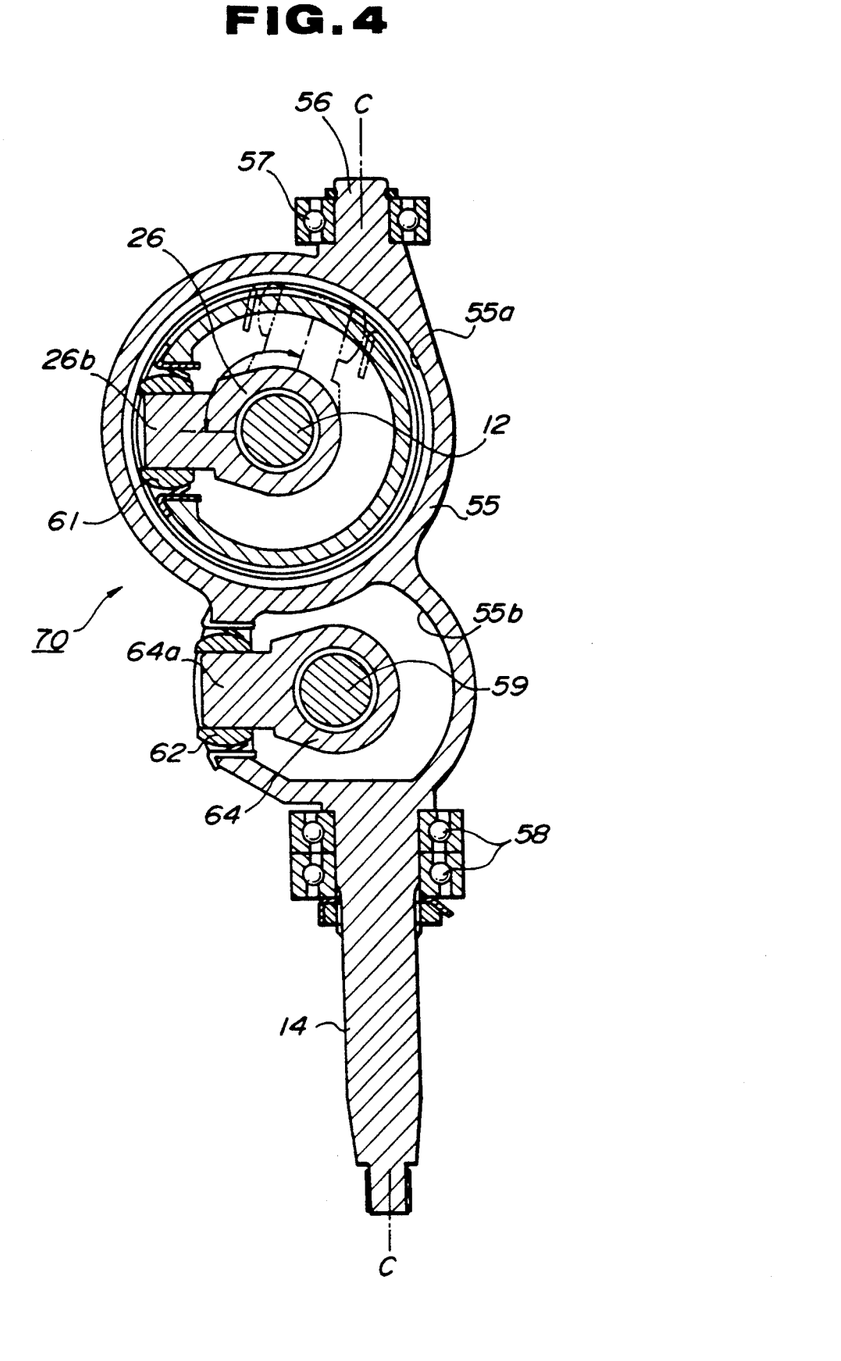
FIG. 4 is a cross-sectional view taken along line IV—IV of FIG. 2.

As shown in FIG. 4, the lever 55 has two upper and lower holes 55a, 55b defined therein which extend perpendicularly to the input shaft 12. The lever 55 also has a support shaft 56 on its upper end, the sector shaft 14 being integrally joined to the lower end of the lever 55. The support shaft 56 and the sector shaft 14 are rotatably supported in the case 13 by respective bearings 57, 58 for rotation about a vertical axis C (see FIGS. 3 and 4).

The input shaft 12 extends through the upper hole 55a, and an auxiliary input shaft 59 and a ball nut 64 extend through the lower hole 55b. As shown in FIGS. 2 and 3, two ring-shaped bearings 60 each composed of an array of balls are disposed on an inner circumferential surface of the upper hole 55a at its opposite axial ends in the axial direction of the conversion nut 26. The bearings 60 have respective inner races in which a spherical bearing 61 is pivotally supported. Similarly, a spherical bearing 62 is angularly movably mounted in the lever 55 laterally of the lower hole 55b. The arm 26b of the conversion nut 26 has a radially outer end engaging in the spherical bearing 61. The ball nut 64, which is axially and angularly movably mounted on the auxiliary input shaft 59, has a radially outwardly extending arm 64a which engages in the spherical bearing 62.

The conversion nut 26, the worm wheel 38, the worm 43, the motor 48, and the lever 55 jointly constitute a steering angle ratio varying mechanism 70. When the motor 48 is energized, the conversion nut 26 is rotated about the input shaft 12, and the position where the arm 26b engages the lever 55 varies with respect to the axis C of the lever 55, thus varying the steering angle ratio. When the arm 26b is in the solid-line position as shown in FIG. 4, the distance (arm length) from the axis C to the position where the arm 26b engages the lever 55 is relatively large, resulting in a relatively small steering angle ratio. When the arm 26b is in the two-dot-and-dash-line position as shown in FIG. 4, the arm length is relatively small, resulting in a relatively large steering angle ratio.

Figure 5:
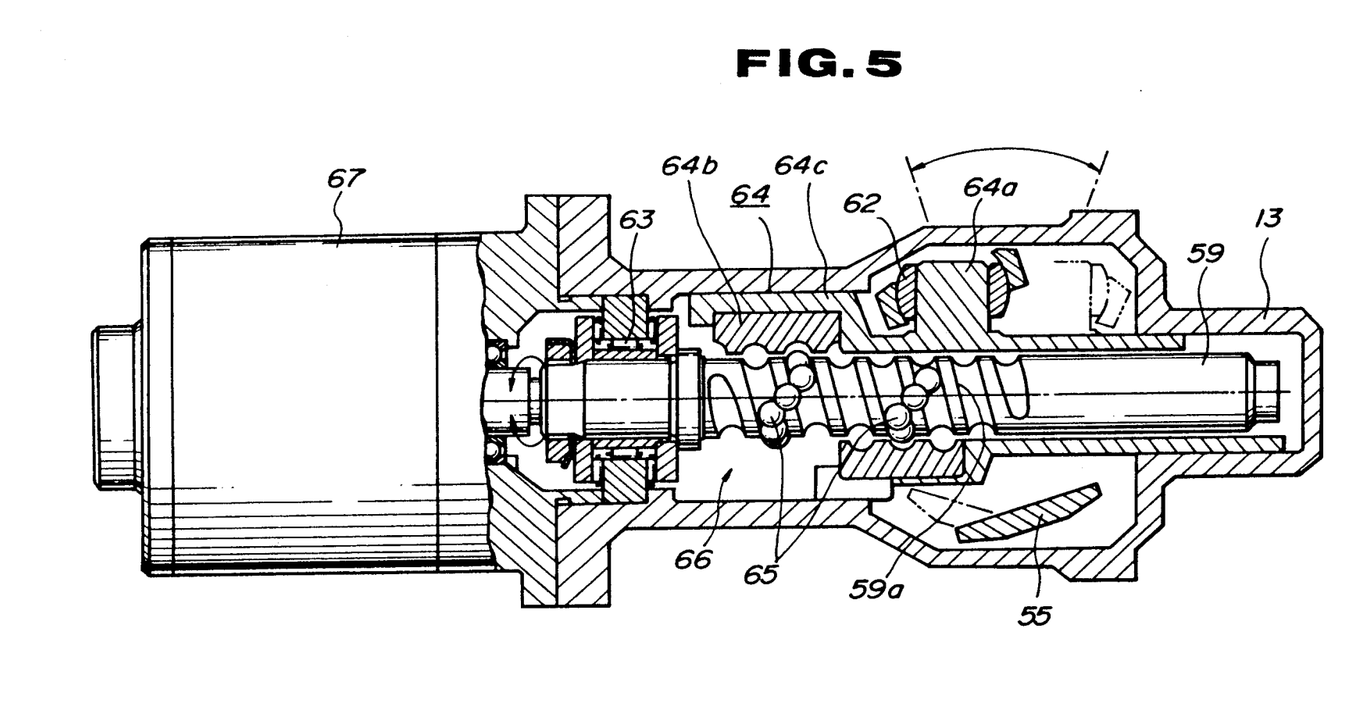
FIG. 5 is a cross-sectional view taken along line V—V of FIG. 2.

As shown in FIG. 5, the ball nut 64 comprises a nut element 64b and a holder 64c which holds the nut element 64b therein. The holder 64c is axially movably mounted on the auxiliary input shaft 59. The auxiliary input shaft 59 has an externally threaded portion 59a. The ball nut 64 is axially movably but angularly immovably disposed on the auxiliary input shaft 59 in the case 13 with balls 65 rollingly riding in helical grooves defined in the nut element 64b and the externally threaded portion 59a. The auxiliary input shaft 59 is rotatably but axially immovably supported in the case 13 by a bearing 63, and has one end coupled to an electric motor 67 which generates assistive forces. The externally threaded portion 59a and the ball nut 64 jointly serve as a second ball screw mechanism 66. As with the first ball screw mechanism 25, when the auxiliary input shaft 59 rotates about its own axis, the ball nut 64 is axially displaced along the auxiliary input shaft 59. Therefore, the angular displacement of the auxiliary input shaft 59 corresponds to the axial displacement of the ball nut 64.

The motor 67 is electrically connected to the controller 90. When the motor 67 is energized by the controller 90, therefore, the auxiliary input shaft 59 is rotated about its own axis by the motor 67. The output torque generated by the motor 67 is applied through the second ball screw mechanism 66 to the lever 55, which applies the torque to the sector shaft 14, thus assisting in turning the sector shaft 14.

The controller 90 comprises a microcomputer or the like with the torque sensor 36 and the steering angle ratio sensor 49 connected thereto. A vehicle speed sensor 0 for producing a signal indicative of the speed of the motor vehicle is also connected to the controller 90. Based on detected signals from these sensors 36, 49, 80, the controller 90 controls energization of the motors 48, 67 to reduce the steering angle ratio when the motor vehicle runs at low speed, and to increase the output torque of the motor 67 when the motor vehicle runs at high speed.

When the motor 48 is energized, the conversion nut 26 is angularly moved to vary the arm length from the axis C to the position where the arm 26b engages the lever 55, thereby varying the steering angle ratio. The motor 48 is controlled based on the detected signal from the vehicle speed sensor 80 such that when the vehicle speed is higher, the steering angle ratio is lower, and when the vehicle speed is lower, the steering angle ratio is higher. As a consequence, the motor vehicle can be maneuvered well when the vehicle speed is lower, and can be driven stably when the vehicle speed is higher.

The output torque of the motor 67 is applied through the second ball screw mechanism 66 and the lever 55 to the sector shaft 14 for thereby assisting in steering the motor vehicle. The energization of the motor 67 is controlled based on detected signals from the torque sensor 36 and the speed sensor 80, i.e., the steering torque and the vehicle speed, such that the output torque of the motor 67 is smaller when the vehicle speed is higher and larger when the vehicle speed is lower. Therefore, the driver of the motor vehicle is given a good steering feeling because the steering assistive torque is smaller when the vehicle speed is higher and larger when the vehicle speed is lower.

The torque sensor 36 which detects the steering torque based on angular movement of the ball nut 23 is positioned closer to the steering wheel 11 than the sector shaft 14, the motor 67 and the steering angle ratio varying mechanism 70 in the path of steering forces from the steering wheel 11 to the pitman arm 15. Therefore, the detected signal from the torque sensor 36 is not greatly affected by a change in the steering angle ratio. As a result, the motor 67 can be controlled for an optimum steering feeling irrespective of a change in the steering angle ratio.

Since the motor 67 is de-energized when the steering wheel 11 is not turned by the driver, no electric energy loss is caused by the motor 67 when the motor vehicle is not steered.

In the above embodiment, the torque sensor 36 detects a steering torque based on axial displacement of the ball nut 25. However, the input shaft 12 may comprise two members interconnected by a torsion bar, and a steering torque applied to the steering shaft may be detected based on relative displacement between the two members.

Figure 7:
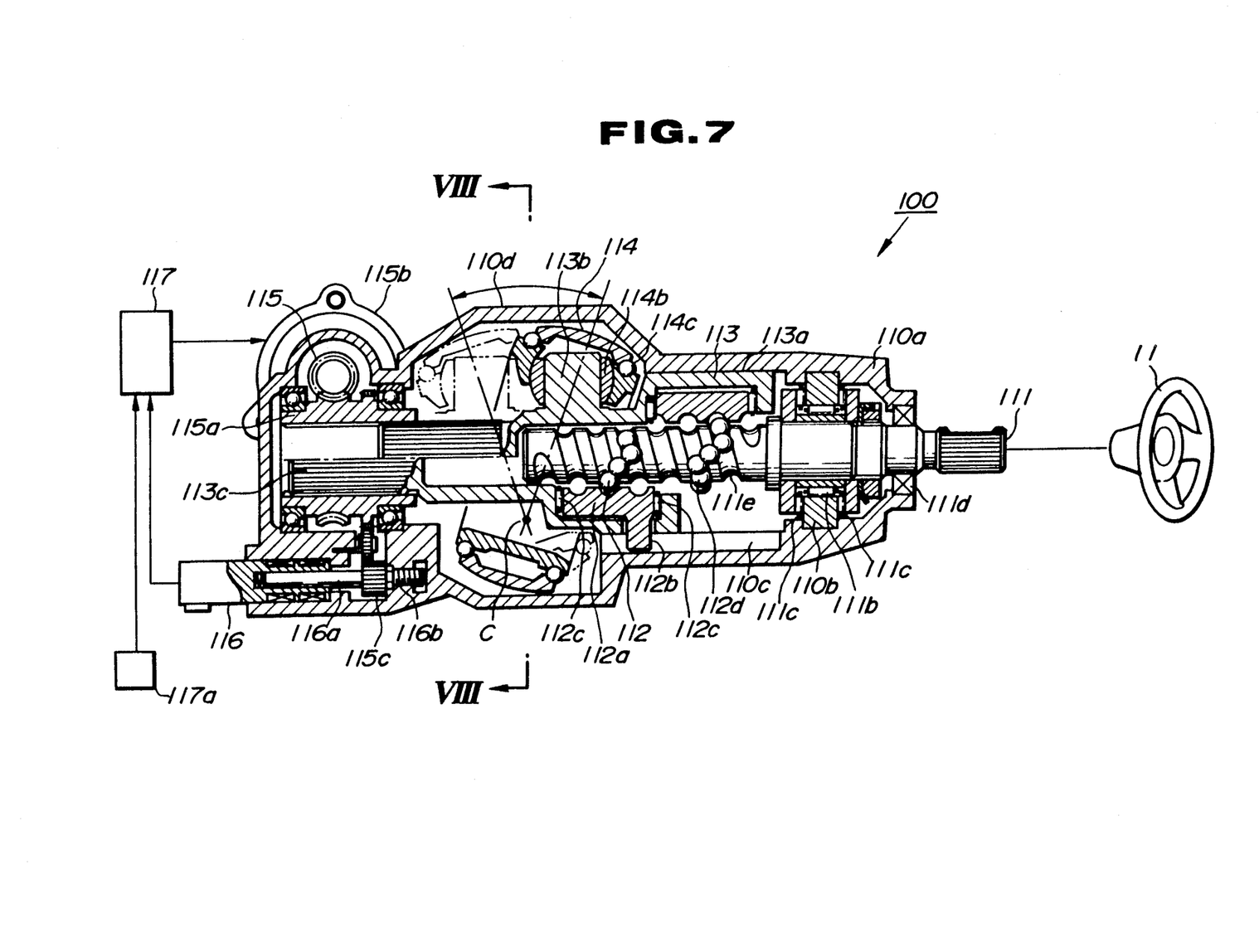
FIG. 7 is a horizontal cross-sectional view of a steering apparatus according to another embodiment of the present invention.
Figure 8:
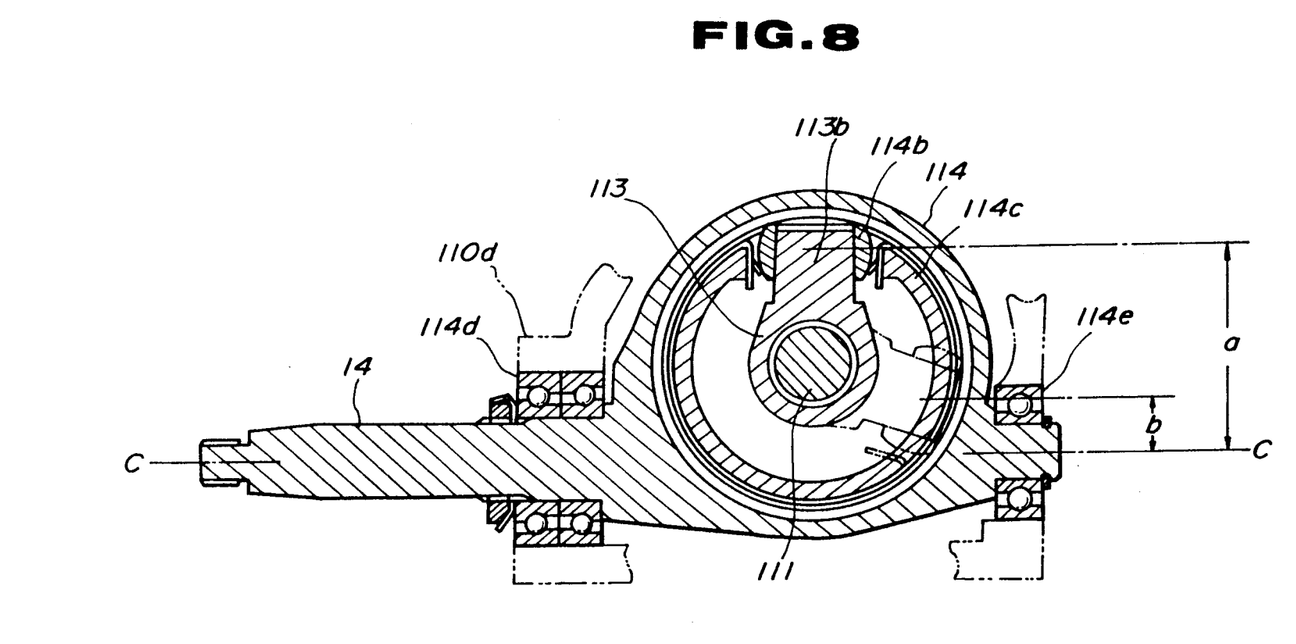
FIG. 8 is a cross-sectional view taken along line VIII—VIII of FIG. 7.

FIGS. 7 and 8 illustrate a steering apparatus according to another embodiment of the present invention. The steering apparatus shown in FIGS. 7 and 8 is a non-power-assisted steering apparatus.

As shown in FIG. 7, the steering apparatus, generally denoted at 100, has a case 110a in which an input shaft 111 coupled to the steering wheel 11 (see FIG. 1) is rotatably supported, a slider or conversion nut 113 axially and angularly movably mounted on the input shaft 111 through a ball screw mechanism 112 which converts rotary motion of the input shaft 111 to linear motion, and a lever 114 engaging the conversion nut 113 for converting linear motion of the conversion nut 113 to rotary motion. The lever 114 is angularly movable about an axis C, and is coupled to the sector shaft 14 (see FIG. 1).

The input shaft 111 is rotatably supported at one end in the case 110a by a bearing including an inner race fixed to the input shaft 111 and having a substantially channel-shaped cross section, and an outer race 110b fixed to the case 110a and rotatably supported in the inner race by axial and radial needle rollers 111b, 111c. The input shaft 111 is thus prevented from being axially displaced in the case 110a. An oil seal 111d is mounted in one end of the case 110a in sealing engagement with the input shaft 111.

The ball screw mechanism 112 includes an externally threaded portion 111e which is an inner end portion of the input shaft 111. The ball screw mechanism 112 also includes a ball nut 112a rotatably held in the conversion nut 113 with balls 112d rollingly riding in helical grooves defined in the ball nut 112a and the externally threaded portion 111e. The ball nut 112a has a pin 112b projecting radially outwardly projecting through the conversion nut 113 and slidably engaging in an axial groove 110c defined in an inner surface of the case 110a. Therefore, when the input shaft 111 is rotated about its own axis, the pin 112b linearly moves in and along the groove 110c. The ball nut 112a is rotatably supported in one end of the conversion nut 113 by thrust bearings 112c.

The conversion nut 113, which is of a hollow shape, has an outer circumferential surface 113a slidably held against an inner circumferential surface of the case 110a for axial and angular movement therein. The conversion nut 113 has an integral arm 113b extending radially outwardly from an intermediate portion thereof. The arm 113b is operatively coupled to a lever 114 which is of a hollow circular shape. The conversion nut 113 is coupled at the other end to a worm wheel 115a through splines or serrations 113c. Therefore, the conversion nut 113 is axially movable with respect to the worm wheel 115a. The worm wheel 115a is rotatably supported in the case 110a by bearings, and is held in mesh with a worm 115.

As also shown in FIG. 8, the arm 113b is operatively connected through a spherical bushing 114b and two ring-shaped bearings 114c each composed of an array of balls to the lever 114. The spherical bushing 114b is supported in inner races of the bearings 114c. The balls of the bearings 114c are rollingly held against an inner circumferential surface of the lever 114.

The lever 114 is disposed in a large-diameter portion 110d of the case 110a, and is integral with the sector shaft 14. The sector shaft 14 is rotatably supported in the large-diameter portion 110d by bearings 114d.

The spherical bushing 114b and the bearings 114c allow the arm 113b and the lever 114 to be smoothly displaced relatively to each other. More specifically, when the conversion nut 113 is angularly moved around the input shaft 111, the arm 113b is angularly displaced smoothly with respect to the lever 114 by the bearings 114c. When the conversion nut 113 is linearly moved in the axial direction, the lever 114 is angularly moved smoothly about the axis C by the spherical bushing 114b.

As shown in FIG. 8, the arm 113b is angularly movable about the input shaft 111 between a solid-line position in which the position where the arm 113b engages the lever 114 is spaced from the axis C by a distance a and a two-dot-and-dash-line position in which the position where the arm 113b engages the lever 114 is spaced from the axis C by a distance b. Stated otherwise, the distance (arm length) between the position where the arm 113b engages the lever 114 and the axis C varies depending on the angular displacement of the conversion nut 113 or the arm 113b, and the arm length determines the steering angle ratio.

As shown in FIG. 7, the worm 115 is coupled to an electric motor 115b mounted on the case 110a. The motor 115b is electrically connected to a controller 117.

The worm 115 is held in mesh with a detection gear 115c through an idler gear. The detection gear 115c is mounted on a core shaft 116a of a differential transformer 116. The core shaft 116a is axially movably supported in the case 110a by a gear 116b on one end of the core shaft 116a. When the detection gear 115c is rotated by the worm 115, the core shaft 116a is axially moved, and the differential transformer 116 produces an output shaft representative of the axial movement of the core shaft 116a, and hence the steering angle ratio.

The differential transformer 116 is electrically connected to the controller 117. A vehicle speed sensor 117a is also electrically connected to the controller 117. In response to detected signals from the differential transformer 116 and the vehicle speed sensor 117a, the controller 117 controls the motor 115b to cause the worm 115 and the worm wheel 115a to vary the angular displacement of the arm 113b, thus adjusting the steering angle ratio depending on the vehicle speed indicated by the detected signal from the vehicle speed sensor 117a. The adjusted steering angle ratio is fed back to the controller 117 through the differential transformer 116.

Figure 9:
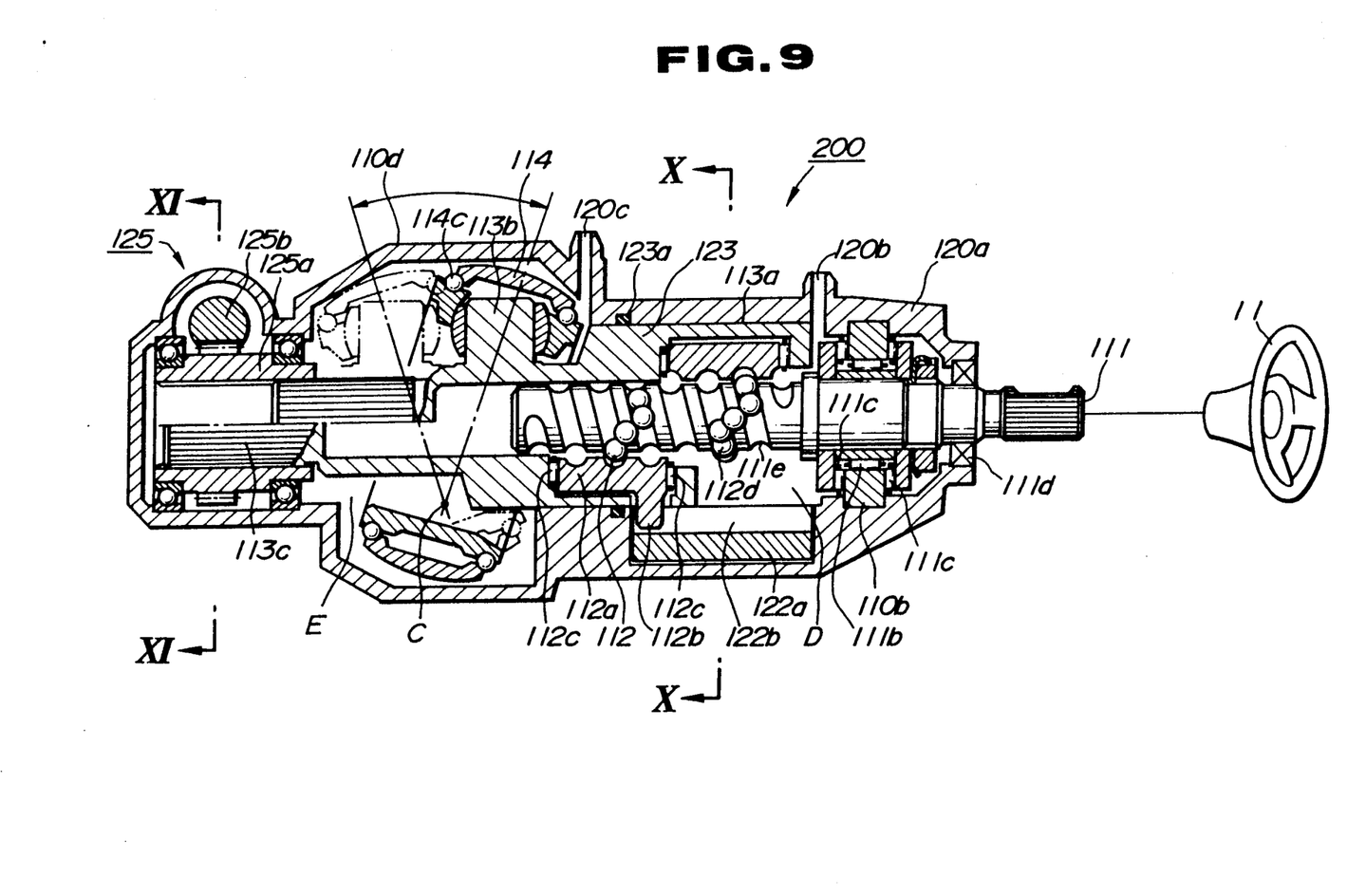
FIG. 9 is a horizontal cross-sectional view of a steering apparatus according to still another embodiment of the present invention.
Figure 10:
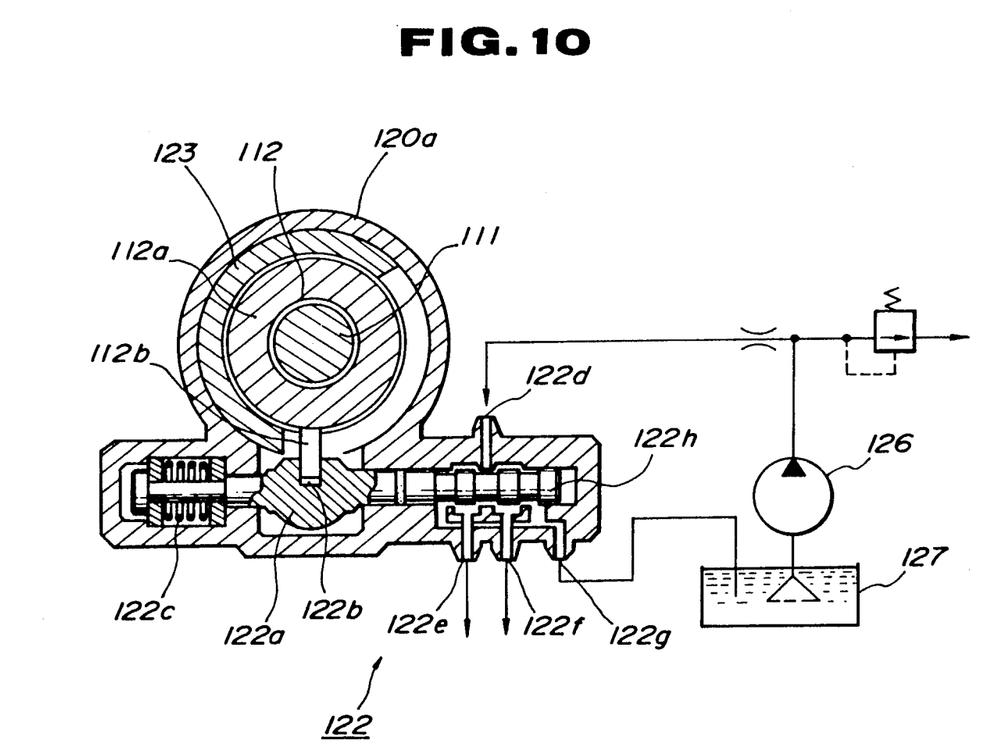
FIG. 10 is a cross-sectional view taken along line X—X of FIG. 9.
Figure 11:
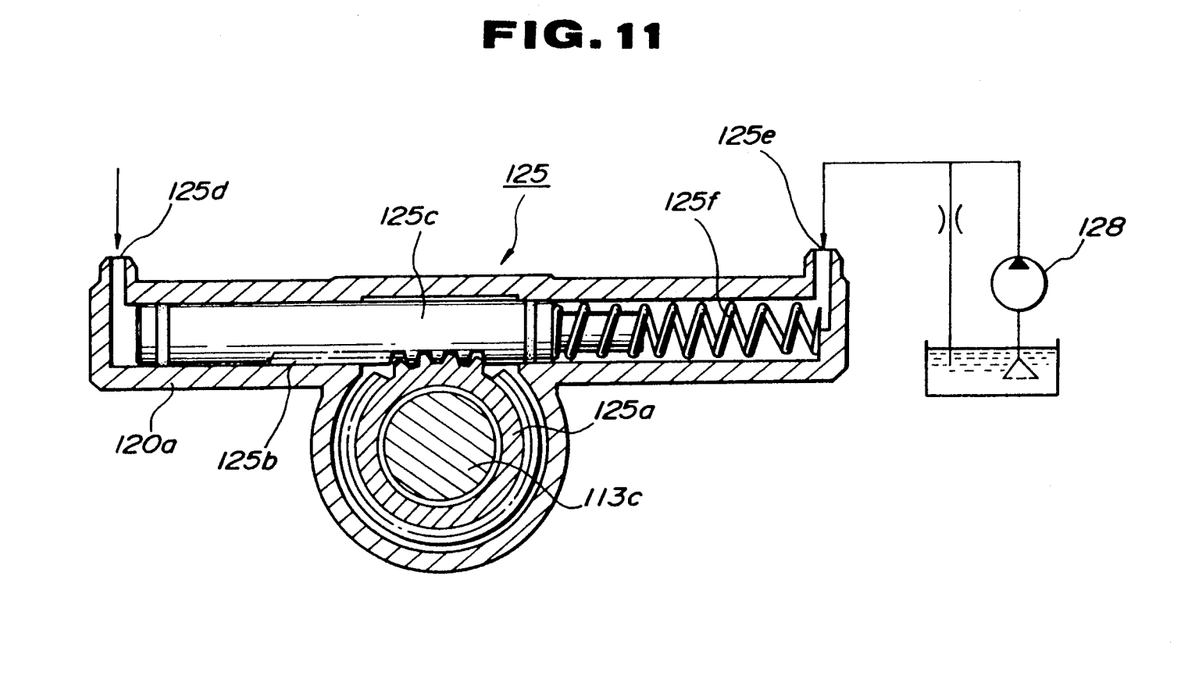
FIG. 11 is a cross-sectional view taken along line XI—XI of FIG. 9.

FIGS. 9 through 11 show a steering apparatus according to still another embodiment of the present invention.

The steering apparatus, generally denoted at 200, is a power-assisted steering apparatus. Since the steering apparatus 200 has many components identical to those of the steering apparatus 100 shown in FIGS. 7 and 8, only those parts which differ from those of the steering apparatus 100 or are newly added will be described below.

As shown in FIG. 9, the input shaft 111 is rotatably supported in a case 120a having oil ports 120b, 120c. The ball nut 112a is angularly movably held in a conversion nut 123 slidably disposed in the case 120a. The pin 112b of the ball nut 112a is connected to a hydraulic pressure control mechanism 122 (see FIG. 10) for assisting in turning the steering wheel 11.

As shown in FIG. 10, the hydraulic pressure control mechanism 122 has a detection rod 122a having a groove 122b in which the pin 112b slidably engages. The detection rod 122a is axially slidably supported in the case 120a for sliding movement in a direction perpendicular to the input shaft 111. The detection rod 122a is normally urged into a neutral position by a spring 122c acting on one end thereof. The other end of the detection rod 122a is associated with a hydraulic directional control valve having an axially movable spool 122h connected to the other end of the detection rod 122a. The hydraulic directional control valve has an input port 122d supplied with working oil under pressure from a hydraulic pump 126 which draws oil from an oil tank 127, and output ports 122e, 122f connected respectively to the oil ports 120b, 120c of the case 120a. The hydraulic directional control valve also has a return port 122g connected to the oil tank 127. Upon rotation of the ball nut 112a, the spool 122h is axially moved to supply working oil from the oil pump 126 selectively to the output port 122e or 122f.

As shown in FIG. 9, the interior of the case 120a is divided into two oil chambers D, E by a seal 123a which is securely mounted in the case 120a and slidably held against the outer circumferential surface of the conversion nut 123. The oil ports 120b, 120c open into the oil chambers D, E, respectively. One end of the conversion nut 123 near the ball nut 112a faces into the oil chamber D, and the other end of the conversion nut 123 faces into the oil chamber E with the lever 114 disposed therein. Therefore, linear movement of the conversion nut 123 is assisted by oil pressure supplied into the oil chamber D from the oil port 120b or the oil chamber E from the oil port 120c.

The input shaft 111 is axially movably but non-rotatably connected by the splines 113c to a pinion 125a rotatably mounted in the case 120a and held in mesh with a rack 125b of a rack-and-pinion mechanism 125. As shown in FIG. 11, the rack 125b is formed on a piston 125c slidably disposed in the case 120a. A constant oil pressure is applied to one end of the piston 125c through an oil port 125d, and an oil pressure depending on the vehicle speed is applied to the other end of the piston 125c through an oil port 125e by a hydraulic pump 128. A spring 125f acts on the other end of the piston 125c to keep the piston 125c in equilibrium under the oil pressures applied thereto.

When the input shaft 111 is rotated by the steering wheel 11, the conversion nut 123 axially moves to cause the arm 113b to turn the lever 114 and hence the sector shaft 14 for thereby steering the motor vehicle. At this time, the axial movement of the conversion nut 123 is assisted by oil pressure supplied to the oil chamber D or E.

Since the oil pressure depending on the vehicle speed is applied axially to the piston 125c, the pinion 125a is rotated to an angular position depending on the speed of the motor vehicle. Therefore, the steering angle ratio is determined depending on the vehicle speed.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A steering apparatus for use with a pitman arm steering mechanism having a pitman arm, comprising:
    a steering wheel;
    a sector shaft rotatable in response to rotation of said steering wheel for steering road wheels through the pitman arm;
    a torque sensor for detecting a steering torque applied to said steering wheel, said torque sensor being positioned closer to said steering wheel than said sector shaft in a path of the steering torque from said steering wheel to said sector shaft;
    electric actuator means operatively coupled to said sector shaft for applying an assistive force to said sector shaft;
    control means for controlling said actuator means based on an output signal from said torque sensor; and
    ratio adjusting means disposed between said sector shaft and said torque sensor for varying the ratio of a angle through which the road wheels are turned to an angle through which said steering wheel is turned.

2. A steering apparatus according to claim 1, further including an input shaft coupled to said steering wheel, and a ball screw mechanism coupled to said input shaft for angularly moving said sector shaft in response to rotation of said input shaft, said torque sensor being operatively connected to said ball screw mechanism.

3. A steering apparatus according to claim 2, wherein said ball screw mechanism has a pin angularly movable in response to rotation of said input shaft, said torque sensor comprising a detection rod connected to said pin and axially movable in a direction perpendicular to said input shaft, and detecting means for detecting the position of said detection rod in said direction.

4. A steering apparatus according to claim 1, wherein said electric actuator means comprises an electric motor, an auxiliary input shaft coupled to said electric motor and rotatable thereby, and a ball screw mechanism coupled to said auxiliary input shaft for angularly moving said sector shaft in response to rotation of said auxiliary input shaft.

5. A steering apparatus for use with a pitman arm steering mechanism having a pitman arm, comprising:
    a steering wheel;
    a conversion member linearly movable in response to rotation of said steering wheel, said conversion member having a radial arm;
    a sector shaft rotatable in response to linear movement of said conversion member for steering road wheels through the pitman arm; and
    a ratio adjusting mechanism operatively coupled between said conversion member and said sector shaft for varying the ratio of an angle through which the road wheels are turned to an angle through which said steering wheel is turned;
    said ratio adjusting mechanism comprising a lever integral with said sector shaft for angular movement in unison therewith, and bearing means disposed between said radial arm and said lever for allowing smooth movement of said radial arm with respect to said lever.

6. A steering apparatus according to claim 5, wherein said bearing means comprises a roller bearing mounted in said lever, and a spherical bushing coupled between said roller bearing and said radial arm.

7. A steering apparatus according to claim 5, further comprising hydraulic actuator means operatively coupled to said input shaft for applying an assistive force to said input shaft.

8. A steering apparatus according to claim 7, wherein said hydraulic actuator means comprises two oil chambers facing opposite ends, respectively, of said conversion member, and a hydraulic pump for applying a hydraulic pressure selectively to said two oil chambers.

9. A steering apparatus according to claim 8, further comprising a torque sensor for detecting a steering torque applied to said steering wheel, said torque sensor being positioned closer to said steering wheel than said sector shaft in a path of the steering torque from said steering wheel to said sector shaft, said hydraulic actuator means comprises a spool for directing said hydraulic pressure to one of said two oil chambers depending on the steering torque detected by said torque sensor.

10. A steering apparatus according to claim 5, further comprising:
 electric actuator means operatively coupled to said sector shaft for applying an assistive force to said sector shaft;
 a torque sensor for detecting a steering torque applied to said steering wheel; and
 control means for controlling said actuator means based on an output signal from said torque sensor.

11. A steering apparatus according to claim 10, wherein said torque sensor is positioned closer to said steering wheel than said sector shaft in a path of the steering torque from said steering wheel to said sector shaft.

12. A steering apparatus according to claim 5, wherein said ratio adjusting mechanism comprises a hydraulic pressure actuator for varying said ratio under hydraulic pressure.

* * * * *